United States Patent [19]

Feldt et al.

[11] 4,407,341

[45] Oct. 4, 1983

[54] APPARATUS FOR REMOVING CONTENTS OF DAMAGED AEROSOL CONTAINERS

[75] Inventors: Adolf Feldt, Gross Hansdorf; Ulrich Jarnuszak, Tangstedt; Rolf Kiessling; Juergen Kock, both of Hamburg, all of Fed. Rep. of Germany

[73] Assignee: Colgate-Palmolive Company, New York, N.Y.

[21] Appl. No.: 262,671

[22] Filed: May 11, 1981

[30] Foreign Application Priority Data

May 16, 1980 [DE] Fed. Rep. of Germany ....... 3018795

[51] Int. Cl.³ .......................... B65B 3/04; B67B 7/20
[52] U.S. Cl. ..................................... 141/97; 141/98; 141/392; 222/87
[58] Field of Search .................. 141/1, 97, 98, 311 R, 141/312, 329, 330, 383, 392; 222/83, 87

[56] References Cited

U.S. PATENT DOCUMENTS 3,926,339 12/1975 Openchowski ....................... 222/83
3,993,221 11/1976 Boynton et al. ...................... 222/87
4,166,481 9/1979 Farris ................................. 222/87 X Primary Examiner—Frederick R. Schmidt
Attorney, Agent, or Firm—Herbert S. Sylvester; Murray M. Grill; John A. Stemwedel

[57] ABSTRACT

An apparatus for safely emptying aerosol spray cans filled with active ingredient and flammable propellant gas which cans have valve seat inserts for spraying the active ingredient is provided. The apparatus comprises an explosion-proof casing (1) with a cap (3), a discharge pipe (7) connected to the lower end of casing (1), a first valve (12) for venting the gaseous propellant and which shuts off discharge pipe (7), a second valve (13) for draining off the liquid active ingredient which shuts off discharge pipe (7) and clamp means (5) sealed in explosion-proof manner passing through the base of casing (1) and which is movable upwardly and downwardly for removing the valve seat from a spray can placed in casing (1).

14 Claims, 2 Drawing Figures

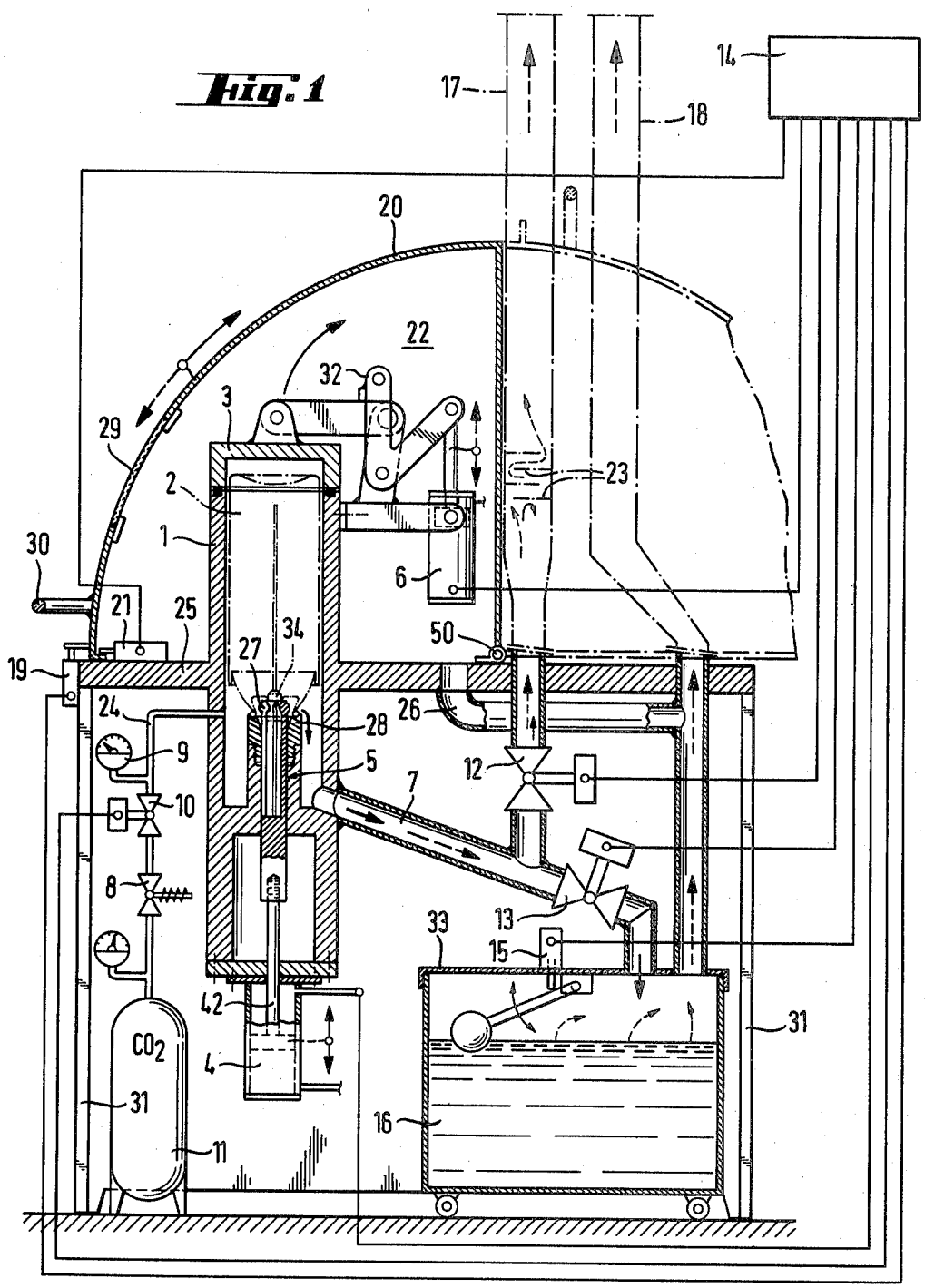

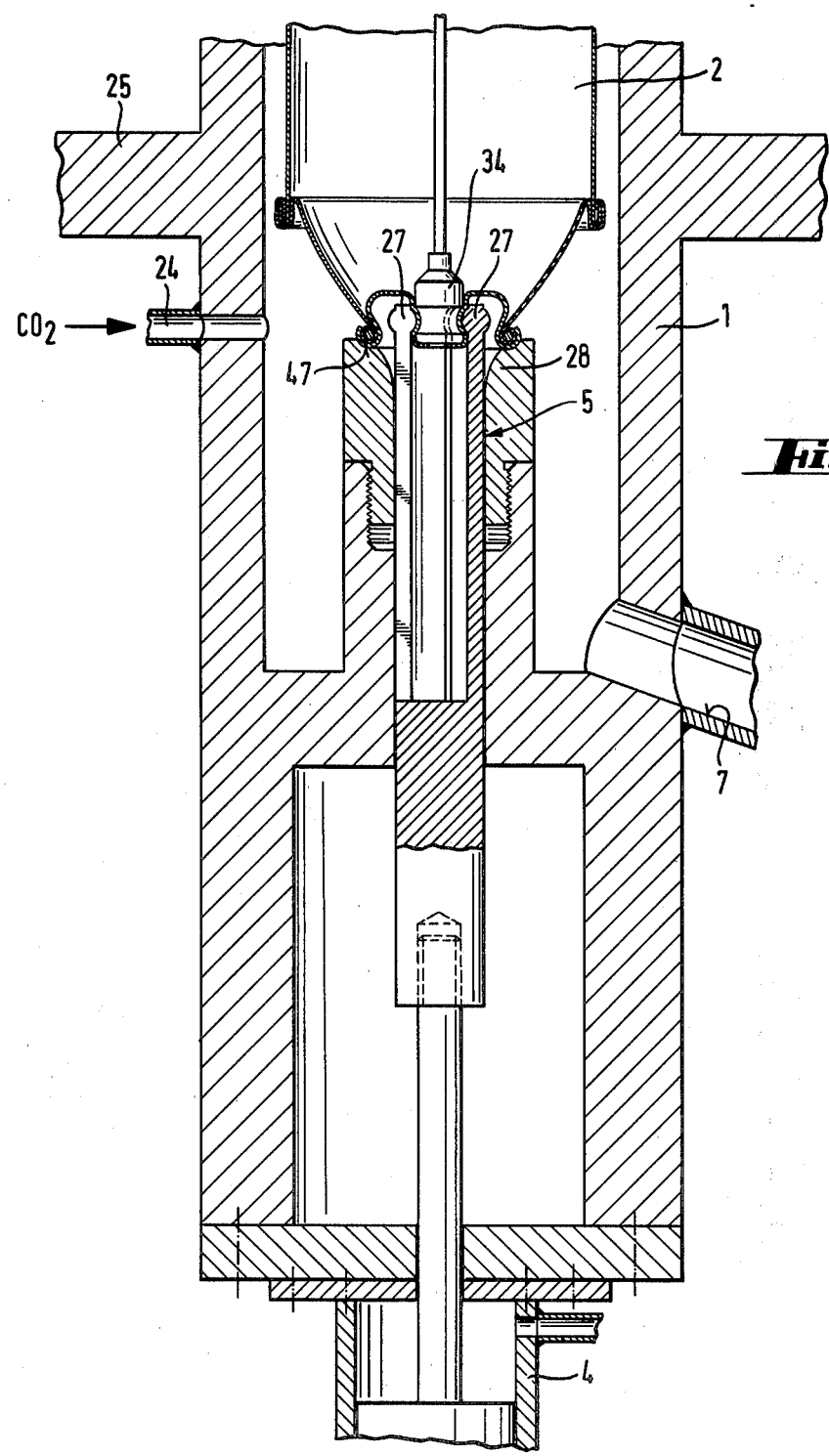

APPARATUS FOR REMOVING CONTENTS OF DAMAGED AEROSOL CONTAINERS

The invention relates to an apparatus for safely emptying aerosol spray cans filled with active ingredient and flammable gaseous propellant.

In the operation of filling and sealing aerosol spray cans a certain proportion of the cans filled is not perfectly sealed, which can either be attributed to an inadequate sealing of the valve seat inserts or to defective cans which have leaks from the outset. Since aerosol spray cans are always filled with an active ingredient and a propelling gas, inadequately sealed cans leak and spray propelling gas and active ingredient in uncontrolled manner. Cans damaged during the filling operation in this way must be removed from the process and subsequently destroyed in order to remove the propelling gas and recover the active ingredient. In the case of aerosol cans filled with incombustible gases as the propelling agent this has hitherto been brought about by driving a brass pin through the bottom of the can. The propelling gas escapes without difficulty from the thus perforated can, while the active ingredient flows out, with the exception of a small amount which collects behind the perforation bead.

For environmental protection reasons the incombustible gases, e.g. halogenated hydrocarbons such as the Freons hitherto used as propelling agents are being increasingly replaced by propelling agents which are less prejudicial to the environment, e.g. a propane/butane mixture, which are however readily flammable.

A disadvantage of the hitherto known devices for opening and emptying damaged filled aerosol spray cans is that when using a perforating pin it is not possible to prevent spark formation, so that there is a considerable risk of explosion of the readily flammable propelling gases. Thus, when using the hitherto known devices spray cans can only be perforated and emptied in special explosion-proof buildings necessitating specially protected buildings and additional transportation from the processing line to the remote protected building.

The object of the invention is to provide an apparatus for safely emptying of damaged aerosol spray cans filled with flammable propelling gases, which can be set up in the immediate proximity of the spray can processing line.

The invention provides an apparatus for safely emptying aerosol spray cans filled with active ingredient and flammable propellant gas, said spray cans having valve seat inserts for expressing the active ingredient, comprising an explosion-proof casing with a cap, a discharge pipe connected to the lower end of said casing, a first valve for venting the gaseous propellant and which shuts off said discharge pipe, a second valve for draining off the liquid active ingredient which shuts off said discharge pipe, and clamp means sealed in explosion-proof manner passed through the base of said casing and which can be moved up and down for removing the valve seat insert from a spray can placed in said casing.

Because of its explosion-proof character, the apparatus can be set up directly alongside the processing line and can be safely operated.

In the accompanying drawings,

FIG. 1 is a diagrammatic view of an apparatus for emptying spray cans.

FIG. 2 is an exploded view of a clamping means used in the apparatus of FIG. 1.

The apparatus for emptying damaged aerosol spray cans shown in FIG. 1 has a table 25 preferably made from steel carried by a frame 31. Table 25 carries a casing 1 for receiving a spray can, the upper end of casing 1 being located above table 25 and the lower end below it. Casing 1 is preferably made from steel and can be sealed with a cap 3, which can be raised from casing 1 by a toggle lever 32 and a second lifting cylinder 6 acting on lever 32. Lifting cylinder 6 is preferably a compressed air cylinder, which is controlled by an automatic central control circuit, 14.

The space above casing 1 and table 25 can also be sealed by a bonnet 20 with a window 29 and a handle 30, providing additional explosion protection against unauthorized opening of cap 3. During the individual emptying stages of can 2 a locking means 21 controlled by the central control circuit 14 keeps the bonnet 20 closed.

The closed bonnet 20 is also in contact with a locking contact 19 mounted on table 25 and which in the closed state supplies a release order or signal to the central control circuit 14. The operating cycle of control circuit 14 is only initiated when this release order is given.

A pipe 26 passes through table 25 which vents the protected space 22 enveloped by bonnet 20 to atmosphere via an auxiliary channel 18. The opening of auxiliary channel 18 is at a considerable distance from apparatus casing 1.

The part of the apparatus located below table 25 comprises the opening and emptying devices. A discharge pipe 7 is connected to the lower end of casing 1 and slopes down to a collecting container 16. According to the present embodiment the collecting container 16 is movable, but it can also be stationary. Between the opening of discharge pipe 7 and the cover of collecting container 16 is provided a second valve 13 controllable by the central control circuit 14 and when said valve is open the active ingredient emptied from can 2 can flow into container 16. Collecting container 16 is also provided with a float switch 15 mounted on container cover 33 and when the central control circuit 14 senses that a predetermined liquid level is exceeded said float switch brings about the closure of the second valve 13 and consequently the shutting off of discharge pipe 7.

A first valve 12, whose outlet is connected to the suction channel 17 is connected via a pipe connection in the flow direction in front of the second valve, 13, i.e. between casing 1 and valve 13. The first valve 12 is arranged vertically, so that when opened it facilitates the upward outflow of the readily volatile propelling gas. Although a vertical arrangement of the first valve 12 is most appropriate, it is also possible to select some other fitting position, provided that an upwardly free flow path only occurs when the valve is open. The opening and closing of the first valve 12 is once again brought about by the central control circuit 14. The suction channel 17 is also provided with baffle plates 23 which separate active ingredient entrained with the propelling gas. The active ingredient separated by the baffle plates 23 drips downwards and collects in front of the second valve 13, in the same way as the active ingredient flowing out of casing 1.

Below table 25 an inert gas line 24 feeds into casing 1 and serves to introduce an inert gas, e.g. $CO_2$ which prevents spark formation during the opening of the can. A third valve 10, which is also opened and closed by the central control circuit 14 is used for shutting off the inert gas line 24. A reducing valve 8 for indirectly adjusting the amount of inert gas introduced into casing 1 is positioned between the inert gas tank 11 and third valve 10. A pressure gauge 9 for indicating the inert gas pressure in casing 1 is connected to inert gas line 24.

Clamp means 5, which can be moved up and down by a lifting cylinder 4 constitutes the nucleus of the apparatus and is passed through the bottom of casing 1 with an explosion-proof seal. FIG. 2 shows details of clamp means 5, having claws 27, whose front end is surrounded by a ring 28. If as a result of the action of lifting cylinder 4 claws 27 are moved upwards in the direction of the can 2 in the drawings, they pass further out of ring 28 and automatically spread radially outwards. Their internal diameter is increased to such an extent that it is possible without difficulty to encircle valve seat insert 34 between claws 27.

On retracting, claws 27 are pressed radially inwards by ring 28 and grip the valve seat insert 34. A further retraction of clamp means 5 leads to the removal of insert 34 from can 2, so that active ingredient and propelling gas can flow unimpeded out of can 2.

Clamp means 5 are operated by lifting cylinder 4, which is preferably a compressed air cylinder and which is also controlled by the central automatic control circuit 14.

The apparatus functions in the following manner. In the initial position bonnet 20 and cap 3 are open. Valves 10, 12 and 13 are closed, while the clamp means 5 are moved upwards. The can 2 to be emptied is placed in casing 1 with the valve side downwards, the internal diameter of casing 1 approximately corresponding to the external diameter of can 2. Can 2 is automatically centered in clamp means 5, which envelop valve seat insert 34. Bonnet 20 is manually pivoted downwards on the table 25 and locking contact 19 is closed. The latter produces a release order for the central control circuit 14, which now blocks locking means 21 and activated the second lifting cylinder 6 for closing cap 3 in a self-locking position by toggle lever 32. After casing 1 has been closed by cap 3, the third valve 10 is operated and inert gas is introduced into casing 1. On reaching the predtermined inert gas pressure the third valve 10 is closed again, followed by the operation of the first lifting cylinder 4. The latter draws clamp means 5 downwards and detaches the valve seat insert 34 from can 2. The propelling gas flows from the thus opened can into casing 1, while the active ingredient flows into casing 1 and finally into discharge pipe 7. It collects in front of the closed second valve 13 at the lowest point of discharge pipe 7.

During the next stage the first valve 12 is opened and the propelling gas in discharge pipe 7 and the lower part of casing 1 flows out through suction channel 17. Active ingredient deposited on baffle plates 23 drips back into the discharge pipe 7 and also collects in front of the second valve 13.

Control circuit 14 now closes the first valve 12 and subsequently opens the second valve 13, so that the active ingredient can flow into collecting container 16. Any propelling gas which may have been entrained with the active ingredient flows out through collecting container cover 33 and auxiliary channel 18. Following the outflow of the active ingredient the second valve 13 is closed again and lifting cylinder 6 is again operated for opening cap 3 also cylinder 4 returns to its initial position. Any propelling gas which may be present can now flow upwards out of casing 1 and passes via line 26 into auxiliary channel 18. Following a preselected time delay after opening cap 3 the locking means 21 are again operated to release bonnet 20. Bonnet 20 can now be swung upwards so that emptied can 2 and the valve seat insert 34 separated from it can be removed.

Having now particularly described and ascertained our said invention and in what manner the same is to be performed, we declare that we claim is:

1. An apparatus for safely emptying aerosol spray cans filled with active ingredient and flammable gaseous propellant which have valve inserts for spraying the active ingredients comprising an explosion-proof casing with a cap, said casing being mounted in a table and being covered by a pivotable bonnet which in its closed position presses down a locking contact which blocks locking means controlling the opening of said bonnet, a discharge pipe connected to the lower end of said casing, a first valve means for venting the gaseous propellant from said discharge pipe to a suction channel, a second valve for draining off the liquid active ingredient from said discharge pipe to a collecting container, clamp means sealed in explosion-proof manner passing through the base of said casing and which is movable relative to said casing for breaking the seal between the spray can placed in said casing and its valve insert, and an automatic control circuit to control said first and second valves, said clamp means, and said bonnet.

2. The apparatus according to claim 1 in which baffle plates for separating liquid active ingredient entrained within said gaseous propellant are provided in said suction channel.

3. The apparatus according to claim 1 in which said suction channel exhausts into the atmosphere at a considerable distance from the apparatus.

4. The apparatus according to claim 1 in which said collecting container is provided with a float switch which closes said second valve when the liquid level is too high.

5. The apparatus according to claim 4 in which said collecting container is removable for emptying or replacement.

6. The apparatus according to claim 1 in which an auxiliary channel for removing subsequently evaporating propellant gas is connected to the top of said collecting container.

7. The apparatus in accordance with claim 6 in which said auxiliary channel exhausts into the atmosphere at a considerable distance from the apparatus.

8. The apparatus according to claim 1 in which said bonnet is closable to form a protective space surrounding the upper end of said casing with said cap.

9. The apparatus according to claim 8 in which said protective space is connected to said auxiliary channel by a line passing through said table.

10. The apparatus according to claim 1 in which an inert gas line which can be shut off by a third valve is connected to said casing.

11. The apparatus according to claim 1 in which said clamp means can be moved upwardly and downwardly by means of a lifting cylinder.

12. The apparatus according to claim 11 in which said lifting cylinder is a compressed air cylinder.

13. The apparatus according to claim 1 in which in the unloaded state said clamp means have automatically spreading claws which on retracting said clamp means can be pressed radially inwardly by a ring.

14. The apparatus according to claim 1 in which said bonnet has a viewing window and a handle.

* * * * *